United States Patent [19]

Alcorn

[11] Patent Number: 4,831,763
[45] Date of Patent: May 23, 1989

[54] FISHING ROD HOLDER

[76] Inventor: David M. Alcorn, Rte. #1, Box 298, Ruffin, N.C. 27326

[21] Appl. No.: 241,878

[22] Filed: Sep. 8, 1988

[51] Int. Cl.⁴ ............................................. A01K 97/10
[52] U.S. Cl. ..................................... 43/21.2; 248/523; 248/540
[58] Field of Search ................. 43/21.2; 248/523, 525, 248/526, 540, 541

[56] References Cited

U.S. PATENT DOCUMENTS

| | | | |
|---|---|---|---|
| 2,211,278 | 8/1940 | Febvre | 43/21.2 |
| 3,126,180 | 3/1964 | Mandolare | 248/41 |
| 3,783,547 | 1/1974 | Bystrom et al. | 248/42 |
| 3,881,269 | 5/1975 | Timmons | 248/42 |
| 4,017,998 | 4/1977 | Dumler | 248/523 |
| 4,495,721 | 1/1985 | Emory, Jr. | 43/27.4 |
| 4,528,768 | 7/1985 | Anderson | 43/21.2 |
| 4,586,688 | 5/1986 | Hartman et al. | 248/43 |

Primary Examiner—Nicholas P. Godici
Assistant Examiner—William Scott Andes

[57] ABSTRACT

A holder for receiving the handle of a fishing rod includes a container having a plate which applies pressure to the rod handle. The container is pivotally attached to a base and by pivoting the container in one direction, pressure is applied to the handle and when the container is pivoted in the opposite direction, the plate withdraws from the rod handle allowing the user to easily extract the fishing rod from the holder.

15 Claims, 4 Drawing Sheets

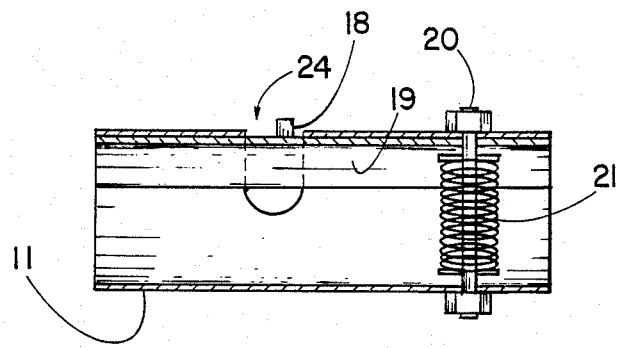
FIG. 4
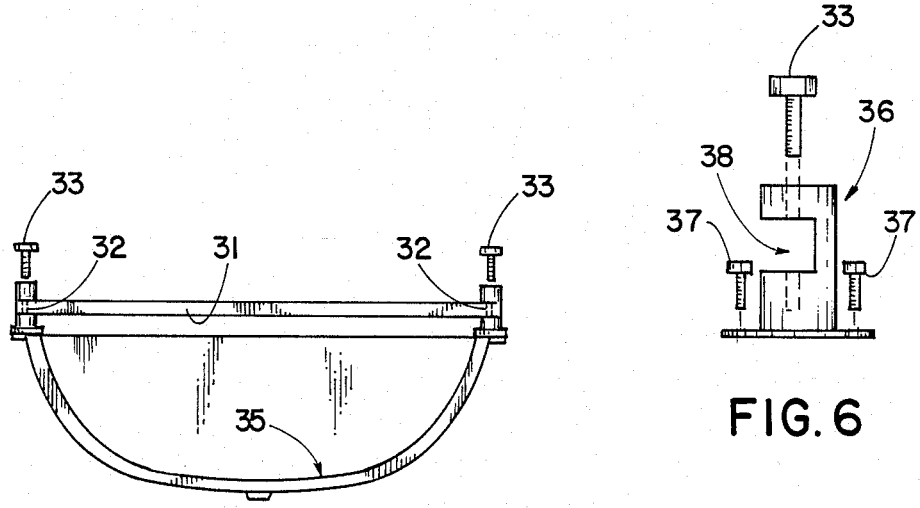
FIG. 5
FIG. 6

4,831,763

FISHING ROD HOLDER

BACKGROUND OF THE INVENTION

1. Field Of The Invention

This invention herein pertains to a fishing rod holder for mounting on a boat or the like for releasably gripping the rod during trolling or other fishing activities.

2. Description Of The Prior Art And Objectives Of The Invention

In the past many devices have been utilized to hold a fishing rod for fishing while aboard boats and also rod holders have been developed for pier and beach fishing to free the hands of the fishermen. Such prior art devices will securely hold a rod to prevent the surf or the strike of a fish from dislodging the rod from holder preventing the rod from being pulled into the water. Fishing rod holders developed in the past often include mechanisms to allow the rod to pivot so the user can pull the rod in an arcuate path to "set" the hook in the event a fish strikes. Other prior art devices have rod locking means as set forth in Dumler U.S. Pat. No. 4,017,998. Thus, the fishing rod holders heretodate conceived are somewhat unwieldy if an attempt is made to remove the rod from the holder to "play" the fish and as a result, a potential strike can be lost by the fisherman. Also, fishing rod holders in the prior art generally do not provide the adjustability pertaining to rod placement desired by users and for this and other reasons the present invention was conceived.

Therefore, with the aforementioned and other disadvantages associated with conventional fishing rod holders, the present invention was developed and one of its objectives is to provide a fishing rod holder which will vary the degree of pressure or gripping force on the fishing rod handle depending on the pivotal motion of the holder.

It is another object of the present invention to provide a rod holder which can be adjustably rotated from side to side and secured at any desired angle.

It is another object of the present invention to provide a fishing rod holder which can be adjusted to tightly grip a fishing rod in its extended position (away from the user) and when rotated by the user, as for example when a fish strikes, to loosen the grip on the rod so the rod can be removed for playing the fish or reeling in the fish as conventionally done.

It is still another object of the present invention to provide a fishing rod holder whereby the particular angle or tilt can be quickly adjusted as particular conditions may dictate.

It is yet another object of the present invention to provide an expansion member for use on a small boat whereby a number of fishing rod holders may be connected thereto with ease and convenience.

Other objects of the present invention will be apparent to those skilled in the art as a more detailed explanation is presented below.

SUMMARY OF THE INVENTION

A fishing rod holder is provided to maintain a firm grip on the rod handle in its extended position during fishing and when a fish strikes, the rod can be manually rotated backwardly toward the user where the grip on the rod is automatically released and the rod can then be removed from the holder in a single action. The rod holder includes a cylindrical container for receiving the rod handle which is mounted to a two pieced base that allows side to side rotation of the holder so the fishing rod can be positioned in a rearward, forward or side direction during fishing and the angle of tilt of the rod can also be adjusted by a crank arm and turnbuckle assembly.

BRIEF DESCRIPTION OF THE DRAWINGS

FIG. 2A shows a left side view of the invention in the extended posture with a partial rod therein while FIG. 2B illustrates an end view of the rod container as shown in FIG. 2A;

FIG. 4 shows a cross-sectional view of the rod container with the rod removed therefrom;

FIG. 5 illustrates the rod extension for mounting rod holders on a small boat or the like;

FIG. 6 depicts a side view of mounting bracket as employed in FIG. 5; and

DESCRIPTION OF THE PREFERRED EMBODIMENT

Figure 1:
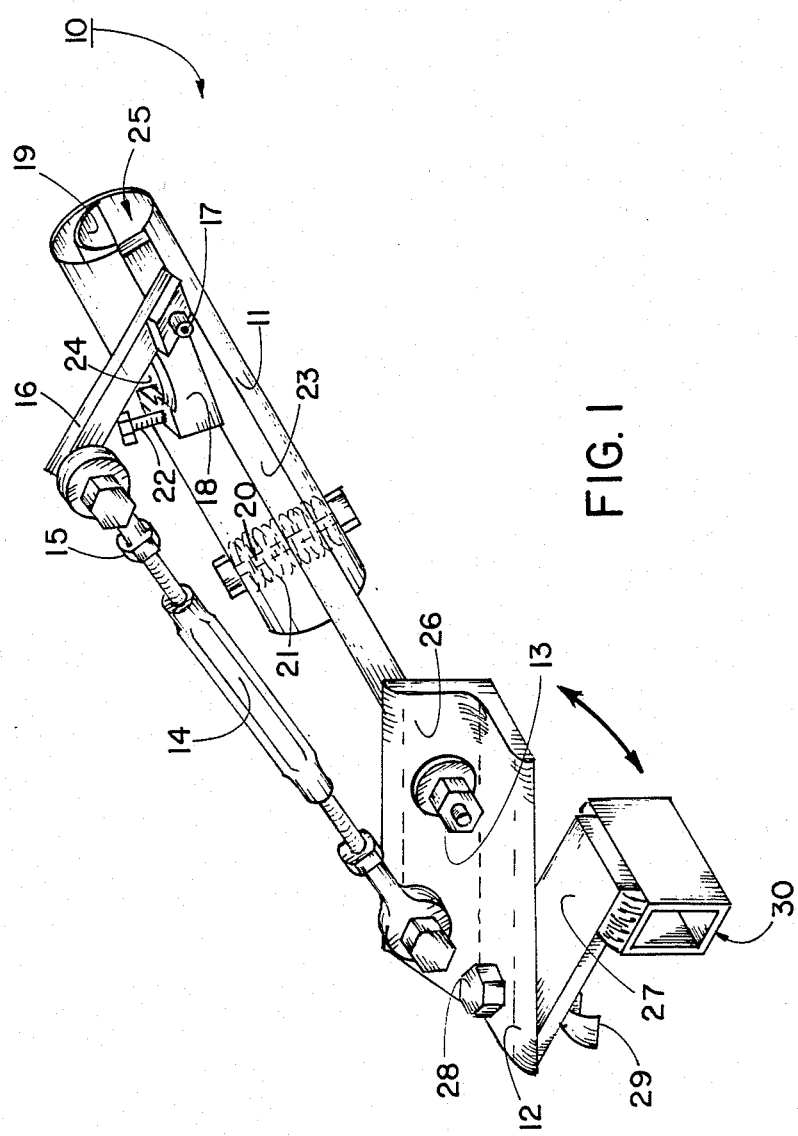
FIG. 1 demonstrates a right side perspective view of the invention.
Figure 7:
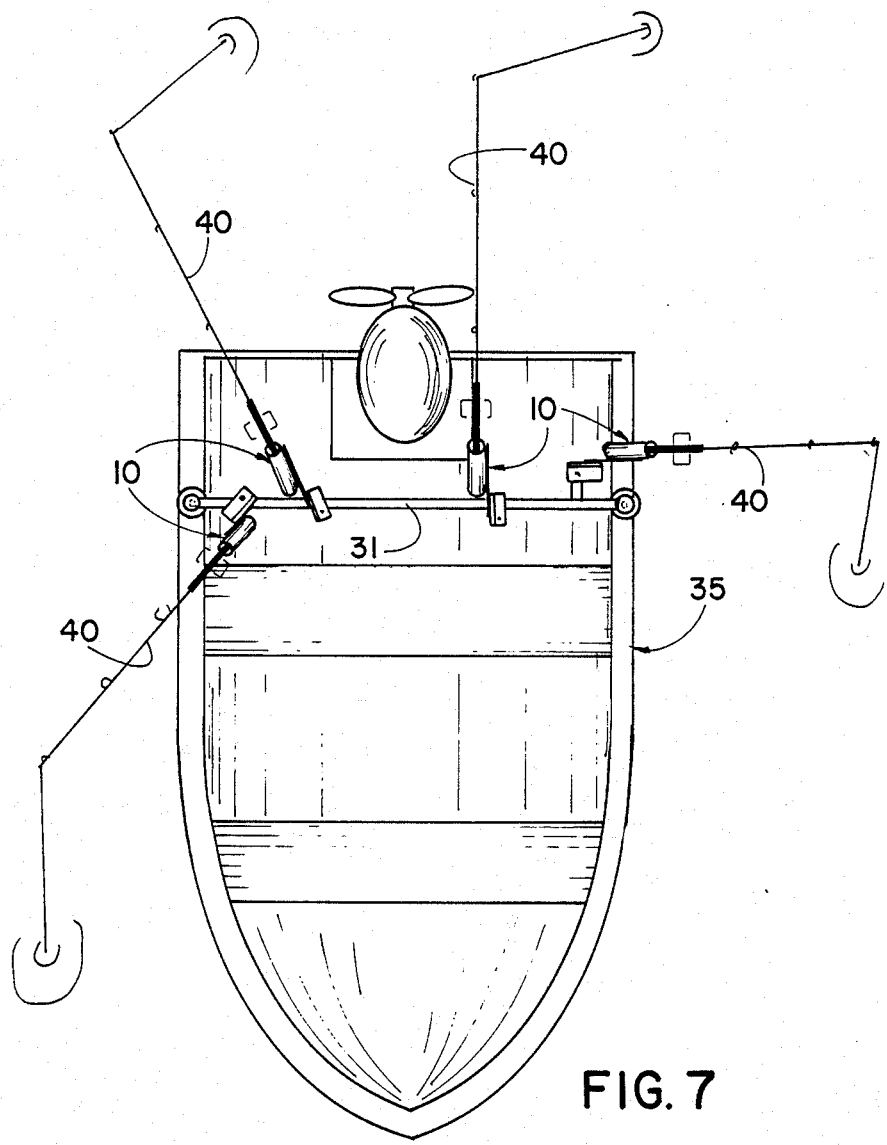
FIG. 7 shows a top view of the rod extension on a boat with four (4) rod holders attached thereto.

The preferred form of the invention as shown in FIG. 1 demonstrates a rod container pivotally joined to a rotatable base. The container includes a gripping means plate which is resiliently affixed within the container and the angle of tilt of the container is adjusted by a turnbuckle. Affixed to the turnbuckle is a crank that includes a lever. The lever contacts the gripping means plate within the container through a slot in the surface of the cylindrical container. The container and crank arm which includes the turnbuckle are both joined to an L-shaped base plate which is rotatably affixed to a flat base plate and can be tightened at any desired position by a wing nut assembly. A tubular connector joined to the flat base plate allows the rod holder to be attached to an extension member that spans the width of a boat as shown in FIG. 7. The turnbuckle, crank, lever, and crank arm comprise an actuation means connected to both the container and the gripping means plate which causes the gripping means plate to firmly engage the rod handle when the container is pivoted to a forward position and release the rod handle when the container is pivoted to a rearward position. The tension pressure applied by the crank lever to the container gripping means can be varied by the lever adjusting means to apply more or less pressure depending on the diameter of the particular rod handle used.

DETAILED DESCRIPTION OF THE DRAWINGS AND OPERATION OF THE INVENTION

For a better understanding of the invention, turning now to the drawings, FIG. 1 illustrates rod holder 10 having a cylindrical container 11 which is pivotally mounted to base 12. Container 11 will pivot around axle 13 in an arcuate path to a first extended or forward position or to a second rearward or relaxed position. The tilt of container 11 as it holds fishing rods 40 as seen in FIG. 7 can be changed by turnbuckle 14 which is attached to crank arm 15. Crank arm 15 is rotatably joined to crank 16 which is substantially v-shaped. Crank 16 is pivotally joined at axle 17 to cylinder 11. Crank lever 18 rigidly attached to crank 16 extends at a right angle to crank 16 and can apply pressure to plate 19 which acts as a fishing rod handle gripping means within container 11. Plate 19 extends substantially the length of container 11 and is affixed therein by bolt 20. Coil spring 21 is positioned around bolt 20 and forces plate 19 upwardly to the top inside wall of container 11. Crank lever 18 applies a downward force to plate 19 and the degree of downward movement of lever 18 can be limited by the extension of lever stop 22 which comprises a threaded bolt which, when extended, will contact cylinder support 23. Cylinder support 23 may be, for example, a ⅛" × ¼" flat elongated metal bar which is welded or otherwise permanently secured to cylinder 11. As would be understood from FIG. 1, lever 18 extends inwardly across cylinder slot 24 as perhaps better seen in FIG. 4 while stop 22 contacts cylinder support 23 positioned between crank 16 and cylinder slot 24. As would be understood, to prevent excessive downward motion of crank lever 18, lever stop 22 is rotated in a clockwise direction to therefore extend it towards cylinder support 23 thereby lessening the downward movement of crank lever 18 into cylinder slot 24. Thus, if a larger rod handle were inserted into open end 25 of container 11, crank lever 18 would penetrate into slot 24 less than, for example, if a smaller diameter rod were inserted into container 11 to securely grip the same.

Depending upon the type of fishing being conducted, it may be desirable for the fishing rod to have a more upright posture. Accordingly, turnbuckle 14 can be rotated in a clockwise direction as shown in FIG. 1 to thereby cause container 11 to raise to a more vertical position and likewise b rotating turnbuckle 14 in a counter-clockwise direction, container 11 will assume a more horizontal posture.

In an addition to the vertical/horizontal adaption of container 11, base 12 provides a rotatable adjustment for rod holder 10. As shown in FIG. 1, base 12 is a formed from upper L-shaped member 26 and flat lower member 27 which are rotatably joined by securing member 28 which passes through apertures in both upper L-shaped member 26 and lower flat member 27 where it is tightened by wing nut 29. Also, affixed to lower flat member 27 is tubular connector 30 which can be mounted over and slid along extension member 31 as shown in FIG. 5. Extension member 31 is a square tubular member formed from metal or suitable plastic or other materials and includes vertical bores 32 on each end thereof for receiving securing means 33. Boat hull 35 as show in FIG. 5 demonstrates a schematic view of a typical small outboard motor boat then whereby hull brackets 36 can be mounted by bolts 37 as shown in FIG. 6 on each side of hull 35. Brackets 36 include an extension member opening 38 for receiving extension member 31. Once in place, securing means 33 can be tightened through extension member 31 into bracket 36 as required. One or more rod holders as shown in FIG. 7 can be mounted along member 31 to maintain fishing rods 40 in place at various desired angles.

As shown in FIG. 4, container 11 is substantially cylindrically shaped and includes slot 24 therein. Crank lever 18 fits within slot 24 and depresses plate 19 onto a fishing rod handle (not shown in FIG. 4) contained therein. Securing bolt 20 passes through an aperture at the rear of plate 19 and coil spring 21 urges plate 19 upwardly into an open configuration.

Figure 2:
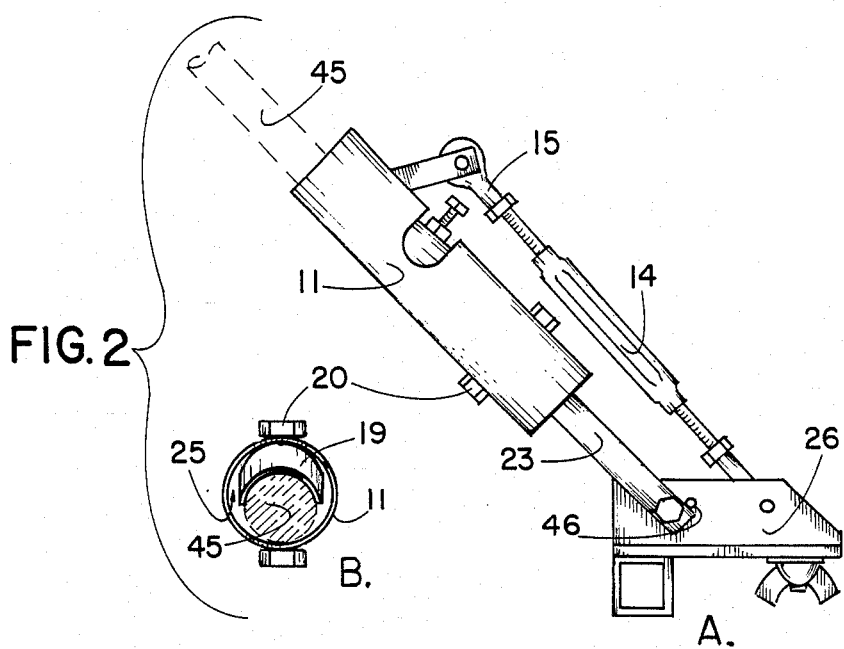
Figure 3:
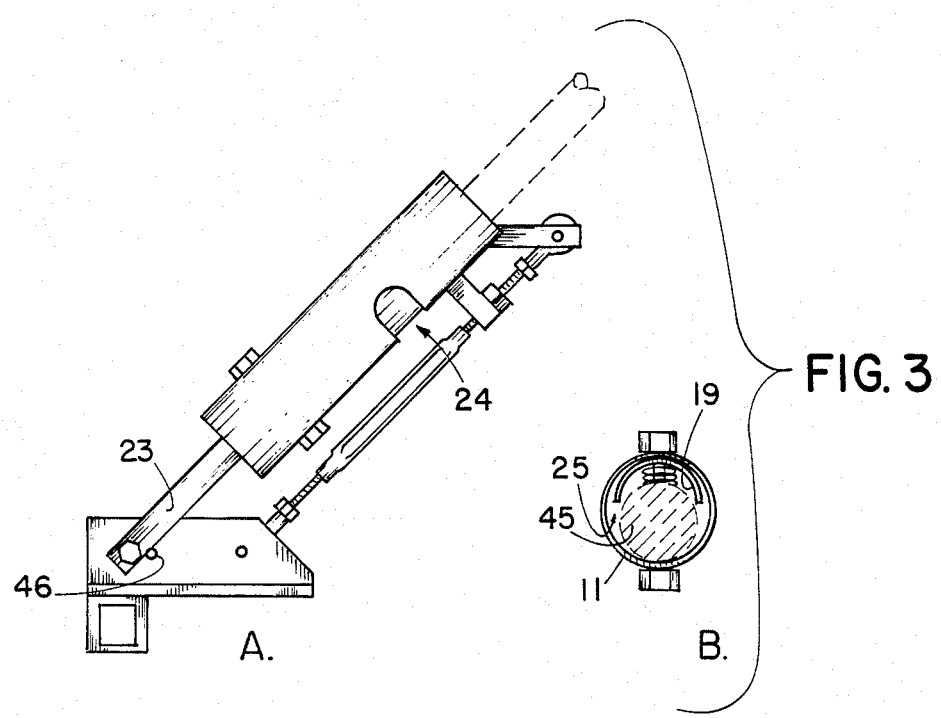
FIG. 3A depicts the rod container as seen in FIG. 2 in a relaxed rearward posture while FIG. 3B pictures the rod container released from gripping engagement with the rod handle.

As shown in FIG. 2B plate 19 which acts as a gripping means is in engagement with rod handle 45. In FIG. 3A, cylinder 11 has been pivoted rearwardly as contrasted with the forward position of container 11 as shown in FIG. 2A whereby plate 19 has released rod handle 45 allowing handle 45 to be easily removed from cylinder 11. As earlier explained, plate 99 is depressed or urged against rod handle 45 by the action of crank lever 18 thus providing a variable pressure or engagement with rod handle 45.

In FIG. 2A, cylinder 11 is tilted at an angle of approximately, 45° with the horizon and by shortening the length of crank arm 15 by the clockwise rotation of turnbuckle 14, cylinder 11 would assume a more erect or vertical posture. The pivotable action of cylinder 11 in either a forward or rearward direction is somewhat limited by stop stud 46 which extends horizontally and is affixed to L-shaped member 26. In FIG. 3A, cylinder support 23 is in contact with stop stud 46 and therefore the pivotable motion of cylinder 11 has been terminated.

As understood from the drawings and the explanatory descriptions, the fishing rod holder of the present invention can be subjected to a variety of angles and directions for maintaining a fishing rod during trolling or otherwise and if a fish strikes, the bait or lure, the fishing rod can be grabbed by the users and rotated toward the user whereby plate 19 acts as a gripping means against rod handle 45 will release handle 45 as container 11 is rotated allowing the user to slide rod 40 from the container 11 for reeling in the fish, or changing bait or otherwise. Also, rod holder 10 can be positioned at any angle to extension member 31 as needed, for example, the rod holder 10 may position rod 40 to the rear, side or the front of boat 35 as needed and can be secured in place. The amount of tension or force which is applied to rod handle 45 by plate 19 can be adjusted by tightening or loosening lever stop 22 to limit the downward motion of crank lever 18 into cylinder slot 24.

The illustrations and examples presented herein are for explanatory purposes and are not intended to limit the scope of the appended claims.

I claim:

1. A fishing rod holder comprising: a pivotable container for placement of a fishing rod therein, a variable engaging rod gripping means, said gripping means attached to said container, and actuation means connected to said gripping means that causes said gripping means to firmly engage said rod in response to pivotal movement of said container to a first position.

2. A fishing rod holder as claimed in claim 1, said actuation means including a gripping means lever, said lever mounted proximate said gripping means.

3. A fishing rod holder as claimed in claim 2, said actuation means further including a gripping means crank, said lever joined to said crank.

4. A fishing rod holder as claimed in claim 3, said actuation means further including a crank arm, said arm adjustably joined to said crank.

5. A fishing rod holder as claimed in claim 4 wherein said crank arm includes a turnbuckle.

6. A fishing rod holder as claimed in claim 1, further including a pivotable base, said container joined to said base.

7. A fishing rod holder as claimed in claim 6 wherein said base includes an L-shaped plate, said rod container joined to said L-shaped plate.

8. A fishing rod holder as claimed in claim 1 and including a resilient member, said resilient member mounted within said container in contact with said gripping means.

9. A fishing rod holder as claimed in claim 1 wherein said container is cylindrically shaped.

10. A fishing rod holder comprising a rod container for placement of a fishing rod therein, a base, said container pivotally mounted to said base, variable engaging rod gripping means, said gripping means positioned within said container, and acutation means connected to said gripping means that causes said gripping means to firmly engage or release said rod in response to pivotal movement of said container, said container pivotable to a first position, said gripping means firmly engaging said rod when said container is in said first position, said container pivotable to a second position, and said gripping means releasing said rod as said container pivots to said second position.

11. A fishing rod holder as claimed in claim 10 wherein said base includes an L-shaped plate, a flat plate, said L-shaped plate rotatably joined to said flat plate, and a connector, said connector attached to said flat plate.

12. A fishing rod holder as claimed in claim 10, said actuation means including a gripping means crank, a crank arm, a gripping means lever, said lever and said crank arm joined to said gripping means crank.

13. A fishing rod holder as claimed in claim 12 wherein said lever drives said rod gripping means against said rod.

14. A fishing rod holder as claimed in claim 10 wherein said container is cylindrically shaped.

15. A fishing rod holder as claimed in claim 10 wherein said container defines a lever slot.

* * * * *